United States Patent
Brushaber et al.

(10) Patent No.: US 11,537,608 B2
(45) Date of Patent: Dec. 27, 2022

(54) SYSTEMS AND METHODS FOR IDENTIFYING COMMON COMPONENTS ACROSS SQL PARSER DIALECTS

(71) Applicant: Embarcadero Technologies, Inc., Austin, TX (US)

(72) Inventors: Kimberly Ann Brushaber, Austin, TX (US); Walter Vigario Couto, Toronto (CA)

(73) Assignee: Embarcadero Technologies, Inc., Austin, TX (US)

( * ) Notice: Subject to any disclaimer, the term of this patent is extended or adjusted under 35 U.S.C. 154(b) by 169 days.

(21) Appl. No.: 16/937,474

(22) Filed: Jul. 23, 2020

(65) Prior Publication Data

US 2021/0049167 A1  Feb. 18, 2021

Related U.S. Application Data

(60) Provisional application No. 62/888,338, filed on Aug. 16, 2019.

(51) Int. Cl.

| | |
|---|---|
| *G06F 16/2452* | (2019.01) |
| *G06F 16/2455* | (2019.01) |
| *G06F 16/22* | (2019.01) |
| *G06F 9/54* | (2006.01) |
| *G06F 40/253* | (2020.01) |
| *G06F 40/166* | (2020.01) |
| *G06F 40/205* | (2020.01) |

(52) U.S. Cl.
CPC ............ *G06F 16/2452* (2019.01); *G06F 9/54* (2013.01); *G06F 16/2246* (2019.01); *G06F 16/24553* (2019.01); *G06F 40/166* (2020.01); *G06F 40/205* (2020.01); *G06F 40/253* (2020.01)

(58) Field of Classification Search
None
See application file for complete search history.

(56) References Cited

U.S. PATENT DOCUMENTS

| | | | | |
|---|---|---|---|---|
| 11,269,824 | B1 * | 3/2022 | Waas | G06F 16/214 |
| 11,403,282 | B1 * | 8/2022 | Waas | G06F 16/214 |
| 11,403,291 | B1 * | 8/2022 | Waas | G06F 16/24534 |
| 2008/0228697 | A1 * | 9/2008 | Adya | G06F 16/212 |

(Continued)

*Primary Examiner* — Kim T Nguyen
(74) *Attorney, Agent, or Firm* — Foley & Lardner LLP

(57) ABSTRACT

A method includes generating a representation of each of a plurality of dialects of structured query language (SQL) statements, and receiving a first SQL statement. The first SQL statement is in a first dialect of the plurality of dialects. The method further includes generating a first output corresponding to the first SQL statement. The first output has a plurality of first data structures arranged in a first tree structure. Each of the plurality of first data structures corresponds to a portion of the first SQL statement. The method further include receiving a second SQL statement, the second SQL statement is in a second dialect of the plurality of dialects, and generating a second output corresponding to the second SQL statement. The second output has a plurality of second data structures arranged in a second tree structure. Each of the plurality of second data structures corresponds to a portion of the second SQL statement. A first data structure of the plurality of first data structures is the same as a second data structure of the plurality of second data structures.

22 Claims, 22 Drawing Sheets

(56) References Cited

U.S. PATENT DOCUMENTS

| | | | |
|---|---|---|---|
| 2008/0319957 A1* | 12/2008 | Muralidhar | G06F 16/24526 |
| 2009/0030870 A1* | 1/2009 | Michailov | G06F 11/0769 |
| 2009/0037394 A1* | 2/2009 | Nagarajan | G06F 16/2452 |
| 2009/0248649 A1* | 10/2009 | Meek | G06F 16/2448 |
| 2021/0049167 A1* | 2/2021 | Brushaber | G06F 40/166 |
| 2021/0165788 A1* | 6/2021 | Couto | G06F 16/2438 |
| 2021/0209098 A1* | 7/2021 | Shi | G06F 16/2448 |

* cited by examiner

First Dialect

```
SELECT time, subject, val,
    FIRST_VALUE(val) OVER (PARTITION BY subject ORDER BY time
        ROWS UNBOUNDED PRECEDING) as 'first',
    LAST_VALUE(val) OVER (PARTITION BY subject ORDER BY time
        ROWS UNBOUNDED PRECEDING) as 'last',
    CUME_DIST() OVER (PARTITION BY subject ORDER BY time) as 'cume_dist',
    PERCENT_RANK() OVER (PARTITION BY subject ORDER BY time) as 'percent_rank'
FROM observations
```
400a Second Dialect

```
SELECT time, subject, val,
    FIRST_VALUE(val) OVER (PARTITION BY subject ORDER BY time
        RANGE BETWEEN UNBOUNDED PRECEDING AND CURRENT ROW) as 'first',
    LAST_VALUE(val) OVER (PARTITION BY subject ORDER BY time
        RANGE BETWEEN UNBOUNDED PRECEDING AND CURRENT ROW) as 'last',
    CUME_DIST() OVER (PARTITION BY subject ORDER BY time
        RANGE BETWEEN UNBOUNDED PRECEDING AND CURRENT ROW) as 'cume_dist',
    PERCENT_RANK() OVER (PARTITION BY subject ORDER BY time
        RANGE BETWEEN UNBOUNDED PRECEDING AND CURRENT ROW) as 'percent_rank'
FROM observations
```
400b Third Dialect

```
SELECT time, subject, val,
    FIRST_VALUE(val) OVER w AS 'first',
    LAST_VALUE(val) OVER w AS 'last',
    CUME_DIST() OVER w AS 'cume_dist',
    PERCENT_RANK() OVER w AS 'percent_rank'
FROM observations
WINDOW w AS (PARTITION BY subject ORDER BY time
    ROWS UNBOUNDED PRECEDING)
```
400c

FIG. 4

Example Syntax Diagram

```
<SELECT statement> ::=
    [ WITH { [ XMLNAMESPACES ,] [ <common_table_expression> [,...n] ] } ]
    <query_expression>
    [ ORDER BY { order_by_expression | column_position [ ASC | DESC ] } 
[,...n] ]
    [ <FOR Clause>]
    [ OPTION ( <query_hint> [ ,...n] ) ]
<query_expression> ::=
    { <query_specification> | ( <query_expression> ) }
    [ { UNION [ ALL ] | EXCEPT | INTERSECT }
    <query_specification> | ( <query_expression> ) [...n ] ]
<query_specification> ::=
SELECT [ ALL | DISTINCT ]
    [TOP ( expression ) [PERCENT] [ WITH TIES ] ]
    < select_list >
    [ INTO new_table ]
    [ FROM { <table_source> } [ ,...n] ]
    [ WHERE <search_condition> ]
    [ <GROUP BY> ]
    [ HAVING < search_condition > ]
```

Lexer Rules

SELECT: S E L E C T ;

/**
*single line comments
*
*CHECK:
*If the user enters a "-..-+" then it will be considered
*as a hint and a HINT token is sent to the parser. So
*the user should not have a comment starting with '+' immediately.
*
*/
SINGLE_LINE_HINT:
    SUBTRACT SUBTRACT PLUS ~[\r\n]*
;

/**
*multi line comments
*
*CHECK:
*If the user enters a "/*+" then it will be considered
*as a hint and a HINT token is sent to the parser. So
*the user should not have a comment starting with '+' immediately.
*
*/
MULTI_LINE_HINT:
    ((FORWARD_SLASH) (STAR) PLUS
    // Handle embedded comments and / or * characters not part of /* or */
    ( (FORWARD_SLASH)* MULTI_LINE_COMMENT | ~[/*] | (FORWARD_SLASH)+ ~[/*] | (STAR)+ ~[/*])*
    // Handle * characters at the end of the file
    (STAR)*
    MULTI_LINE_COMMENT_NON_STARTED)
;

Parser Rules

```
subquerySubPartDef:
    selectClause
    ( selectIntoClause )?
    fromClause
    ( whereClause )?
    ( subquerySubPartOptions )?
    ({getServerVersion() >= 1001}? subquerySubPartModelDef )?
    ( orderByClause )?
    ({getServerVersion() >= 1201}? rowLimitingClause )?
;

selectClause:
    SELECT ( hint )? ( queryPreamble )? selectList
;
```

FIG. 8

Parse Tree / Fragment Tree Example

```
start
    sqlMultipleStatements
        sqlStatement
            sqlCommand
                subOrSelectCommandNoCTE
                    subOrSelectCommandDef
                        select
                            nestedSubQuery
                                querySpecification
                                    querySpecificationWithFrom
                                        querySpecificationWithFromStart
                                            selectClause "SELECT"
                                                selectList
                                                    columnExpr
                                                        selExpr
                                                            expression
                                                                compoundExpr
                                                                    compoundExpr2
                                                                        compoundExpr2_2005
                                                                            userDefinedFunctionsOrSimpleExpr
                                                                                columnName
                                                                                    identifier "time"
                                                    " "
                                                    ,
                                                    selectList
                                                    columnExpr
                                                        selExpr
                                                            expression
                                                                compoundExpr
                                                                    compoundExpr2
                                                                        compoundExpr2_2005
                                                                            userDefinedFunctionsOrSimpleExpr
                                                                                columnName
                                                                                    identifier "subject"
                                                    " "
                                                    ,
                                                    selectList
                                                    columnExpr
                                                        selExpr
                                                            expression
                                                                compoundExpr
                                                                    compoundExpr2
                                                                        compoundExpr2_2005
                                                                            userDefinedFunctionsOrSimpleExpr
                                                                                columnName
                                                                                    identifier "val"
```

```
                            " "
                              ,
                        selectList
                      columnExpr
                        selExpr
                          expression
                            compoundExpr
                              compoundExpr2
                                compoundExpr2_2005                              900
                                  builtinfunctions
                                    analyticFunction "FIRST_VALUE" "("
                                      expressionAsFunctionParamList
                                        expressionAsFunctionParam
                                          expression
                                            compoundExpr
                                              compoundExpr2
                                                compoundExpr2_2005 userDefinedFunctionsOrSimpleExpr
                                                  columnName
                                                    identifier "val"
                                    ")"
                                    overClauseRowRange "OVER" "("
                                      partitionByClause "PARTITION" "BY"
                                        expressionList
                                          expression
                                            compoundExpr
                                              compoundExpr2
                                                compoundExpr2_2005 userDefinedFunctionsOrSimpleExpr
                                                  columnName
                                                    identifier "subject"
                                      orderByClause "ORDER" "BY"
                                        orderByLoop
                                          orderByExpr
                                            expression
                                              compoundExpr
                                                compoundExpr2
                                                  compoundExpr2_2005 userDefinedFunctionsOrSimpleExpr
                                                    columnName
                                                      identifier "time"
                                      rowRangeClause "ROWS"
                                        windowFramePreceding "UNBOUNDED"
```

FIG. 9B

"PRECEDING"
                                                    ")"
                                        "as"
                                  identOrAtIdentOrLiteralNoColon
                                  identOrAtIdentOrLiteral
                                    text
                                      quotedString
                                        string_literal "'first'"
                                  ","
                                  selectList
                                  columnExpr
                                    selExpr
                                      expression
                                        compoundExpr
                                          compoundExpr2
                                            compoundExpr2_2005
                                              builtinfunctions
                                                analyticFunction "LAST_VALUE" "("
                                                  expressionAsFunctionParamList
                                                    expressionAsFunctionParam
                                                      expression
                                                        compoundExpr
                                                          compoundExpr2
                                                            compoundExpr2_2005
userDefinedFunctionsOrSimpleExpr
                                                              columnName
                                                                identifier "val"
                                          ")"
                                          overClauseRowRange "OVER" "("
                                            partitionByClause "PARTITION" "BY"
                                              expressionList
                                                expression
                                                  compoundExpr
                                                    compoundExpr2
                                                      compoundExpr2_2005
userDefinedFunctionsOrSimpleExpr
                                                        columnName
                                                          identifier "subject"
                                            orderByClause "ORDER" "BY"
                                              orderByLoop
                                                orderByExpr
                                                  expression
                                                    compoundExpr
                                                      compoundExpr2
                                                        compoundExpr2_2005

```
userDefinedFunctionsOrSimpleExpr
                                              columnName
                                                identifier "time"
                            ")"
                     "as"
                     identOrAtIdentOrLiteralNoColon
                     identOrAtIdentOrLiteral
                     text
                     quotedString
                            string_literal "'cume_dist'"
                  ","
                selectList
             columnExpr
              selExpr
                expression
                  compoundExpr
                    compoundExpr2
                      compoundExpr2_2005
                        builtinfunctions
                          analyticFunction "PERCENT_RANK" "(" ")"
                          overClauseRowRange "OVER" "("
                            partitionByClause "PARTITION" "BY"
                              expressionList
                                expression
                                  compoundExpr
                                    compoundExpr2
                                      compoundExpr2_2005
userDefinedFunctionsOrSimpleExpr
                                              columnName
                                                identifier "subject"
                            orderByClause "ORDER" "BY"
                              orderByLoop
                                orderByExpr
                                  expression
                                    compoundExpr
                                      compoundExpr2
                                        compoundExpr2_2005
userDefinedFunctionsOrSimpleExpr
                                              columnName
                                                identifier "time"
                            ")"
                     "as"
                     identOrAtIdentOrLiteralNoColon
                     identOrAtIdentOrLiteral
                     text
                        quotedString
                           string_literal "'percent_rank'"
                 fromClause "FROM"
                   tableSourceLoop
                     tableSource
                       tableSourceWithoutFrag
                         tableSourceExpr
                           tableName
                             identifier "observations"
```

FIG. 9E

Annotated Parse Tree

```
sqlCommand => SQLCOMMAND
  subOrSelectCommandNoCTE =>SELECTSTATEMENT "SELECT time, subject, val,...from observations"
    selectClause =>SELECTCLAUSE " SELECT time, subject, val,...as 'percent_rank'"
      selectList => SELECTCOLUMN "time"
        expression => EXPRESSION "time"
          columnName => COLUMNNAME "time"
      selectList => SELECTCOLUMN "subject"
        expression => EXPRESSION "subject"
          columnName => COLUMNNAME "subject"
      selectList => SELECTCOLUMN "val"
        expression => EXPRESSION "val"
          columnName => COLUMNNAME "val"
      selectList => SELECTCOLUMN "FIRST_VALUE(val) OVER..."
        expression => EXPRESSION "FIRST_VALUE(val) OVER..."
          builtinfunctions => BUILTINFUNCTION "FIRST_VALUE(val) OVER..."
            expressionAsFunctionParamList => FUNCTIONPARAMETERSLIST "val"
              expressionAsFunctionParam => FUNCTIONPARAMETER "val"
                expression => EXPRESSION "val"
                  columnName => COLUMNNAME "val"
            expression => EXPRESSION "subject"
              columnName => COLUMNNAME "subject"
            orderByClause => ORDERBYCLAUSE "ORDER BY time"
              orderByExpr=>ORDERBYCOLUMN "time"
                expression => EXPRESSION "time"
                  columnName => COLUMNNAME "time"
      selectList => SELECTCOLUMN "LAST_VALUE(val) OVER..."
```

```
expression => EXPRESSION "LAST_VALUE(val) OVER..."
        builtinfunctions => BUILTINFUNCTION "LAST_VALUE(val) OVER..."
            expressionAsFunctionParamList => FUNCTIONPARAMETERSLIST "val"
                expressionAsFunctionParam => FUNCTIONPARAMETER "val"
                    expression => EXPRESSION "val"
                        columnName => COLUMNNAME "val"
            expression => EXPRESSION "subject"
            columnName => COLUMNNAME "subject"
            orderByClause => ORDERBYCLAUSE "ORDER BY time"
                orderByExpr=>ORDERBYCOLUMN "time"
                    expression => EXPRESSION  "time"
                        columnName => COLUMNNAME "time"
selectList => SELECTCOLUMN "CUME_DIST() OVER..."
expression => EXPRESSION  "CUME_DIST() OVER..."
        builtinfunctions => BUILTINFUNCTION "CUME_DIST() OVER..."
        expression => EXPRESSION "subject"
        columnName => COLUMNNAME "subject"
        orderByClause => ORDERBYCLAUSE "ORDER BY time"
            orderByExpr=>ORDERBYCOLUMN "time"
                expression => EXPRESSION "time"
                    columnName => COLUMNNAME "time"
selectList => SELECTCOLUMN "PERCENT_RANK() OVER..."
expression => EXPRESSION "PERCENT_RANK() OVER..."
        builtinfunctions => BUILTINFUNCTION "PERCENT_RANK() OVER..."
        expression => EXPRESSION "subject"
        columnName => COLUMNNAME "subject"
        orderByClause => ORDERBYCLAUSE "ORDER BY time"
            orderByExpr=>ORDERBYCOLUMN "time"
                expression => EXPRESSION "time"
                    columnName => COLUMNNAME "time"
fromClause => FROMCLAUSE "FROM observations"
    tableSource=>TABLEREFERENCE "observations"
```

API Tree

```
ISQLCommand
  ISelectStatement
    ISelectClause
      ISelectColumn
        ISQLFragment
          IColumnName
      ISelectColumn
        ISQLFragment
          IColumnName
      ISelectColumn
        ISQLFragment
          IColumnName
      ISelectColumn
        ISQLFragment
          IBuiltinFunctionFragment
            ISQLFragment
              ISQLFragment
                ISQLFragment
                  IColumnName
              ISQLFragment
                IColumnName
              ISQLFragment
                IColumnName
                  IOrderByClause
                    IOrderByColumn
                      ISQLFragment
                        IColumnName
```

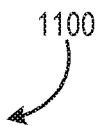

FIG. 11A

```
ISelectColumn
  ISQLFragment
    IBuiltinFunctionFragment
      ISQLFragment
        ISQLFragment
          ISQLFragment
            IColumnName
        ISQLFragment
        IColumnName
        ISQLFragment:
          IColumnName
            IOrderByClause
              IOrderByColumn
                ISQLFragment
                  IColumnName
ISelectColumn
  ISQLFragment
    IBuiltinFunctionFragment
      ISQLFragment
        IColumnName
      ISQLFragment:
      IColumnName
        IOrderByClause
          IOrderByColumn
            ISQLFragment
              IColumnName
ISelectColumn
  ISQLFragment
    IBuiltinFunctionFragment
      ISQLFragment
      IColumnName
      ISQLFragment
      IColumnName
        IOrderByClause
          IOrderByColumn
            ISQLFragment
              IColumnName
IFromClause
  ITableReference
```

API Interface Definition examples

```
class SQLPARSERSCPP_PUBLIC ISelectStatement : public IDMLStatement
{
public:
virtual ~ISelectStatement();
/// <returns> the preable if set, null otherwise </returns>
virtual std::shared_ptr<ISelectPreamble> getPreamble() = 0;
/// <returns> the select clause if any </returns>
virtual std::shared_ptr<ISelectClause> getSelectClause() = 0;
/// <returns> the from clause if any </returns>
virtual std::shared_ptr<IFromClause> getFromClause() = 0;
/// <returns> the where clause if any </returns>
virtual std::shared_ptr<IWhereClause> getWhereClause() = 0;
/// <returns> the having clause if any </returns>
virtual std::shared_ptr<IHavingClause> getHavingClause() = 0;
/// <returns> the group by clause if any </returns>
virtual std::shared_ptr<IGroupByClause> getGroupByClause() = 0;
/// <returns> the order by clause if any </returns>
virtual std::shared_ptr<IOrderByClause> getOrderByClause() = 0;
/// <returns> the chained query clause if any </returns>
virtual std::vector<std::shared_ptr<IChainedQueriesClause>> getChainedQueriesClauses() = 0;
/// <returns> the select into clause if any </returns>
virtual std::shared_ptr<ISelectIntoClause> getSelectIntoClause() = 0;
/// <returns> the fetch first clause if any </returns>
virtual std::shared_ptr<IGenericFragment> getFetchFirstClause() = 0;
/// <returns> the optimize clause if any </returns>
virtual std::shared_ptr<IGenericFragment> getOptimizeClause() = 0;
/// <returns> the read only clause if any </returns>
virtual std::shared_ptr<IGenericFragment> getReadOnlyClause() = 0;
/// <returns> the update clause if any </returns>
virtual std::shared_ptr<IGenericFragment> getUpdateClause() = 0;
/// <returns> the isolation clause if any </returns>
virtual std::shared_ptr<IGenericFragment> getIsolationClause() = 0;
/// <returns> the clause if any </returns>
virtual std::shared_ptr<IWithCommonTableExpressionClause>
```

```
</returns>
    virtual bool hasCatalog() = 0;
    /// <returns> the token that holds the server, null if no server </returns>
    virtual std::shared_ptr<parsingframework::ITokenDescriptor> getServer() = 0;
    /// <returns> true if the table reference has a server, false if it's a nested table reference </returns>
    virtual bool hasServer() = 0;
    /// <returns> the token that holds the table alias, null if no alias </returns>
    virtual std::shared_ptr<parsingframework::ITokenDescriptor> getAlias() = 0;
    /// <returns> if this is a subselect, return it otherwise null </returns>
    virtual std::shared_ptr<ISQLFragment> getNestedTable() = 0;
    /// <summary>
    /// If the table reference is a subselect
    /// <P>
    /// if getTableName() == null, then getNestedTable() != null
    /// </P>
    /// <P>
    /// if getNestedTable() == null, then getTableName() != null
    /// </P>
    /// </summary>
    /// <returns> true if it is a nested table </returns>
    virtual bool isNestedTable() = 0;
    /// <returns> true if it has a join clause </returns>
    virtual bool hasJoinClause() = 0;
    /// <returns> the join clause if it exists </returns>
    virtual std::shared_ptr<IJoinClause> getJoinClause() = 0;
    /// <returns> the dblink fragment </returns>
    virtual std::shared_ptr<ISQLFragment> getDbLink() = 0;
    /// <returns> a table reference function if it exists </returns>
    virtual std::shared_ptr<ISQLFragment> getTableReferenceFunction() = 0;
    ///
    /// <returns> the tableReference function name if this one exists </returns>
    virtual std::shared_ptr<parsingframework::ITokenDescriptor> getTableRefFunctionName() = 0;
    /// <returns> true if the table reference has a table reference function name </returns>
    virtual bool hasTableRefFunctionName() = 0;
    /// <returns> the pivot clause if it exists </returns>
    virtual std::shared_ptr<IPivotClause> getPivotClause() = 0;
    /// <returns> the unpivot clause if it exists </returns>
    virtual std::shared_ptr<IPivotClause> getUnpivotClause() = 0;
    /// <returns> the table hints </returns>
    virtual std::shared_ptr<ISQLFragment> getTableHints() = 0;
    /// <returns> the whole USERDEFINEDFUNCTION fragment from the TABLEREFERENCE, null if it doesn't exist any </returns>
    virtual std::shared_ptr<ISQLFragment> getUDFFragment() = 0;
};
```

```
private:
    int m_serverVersion = 0;                    1300a
public:
 int getServerVersion()
 {
        return m_serverVersion;
 }
```

```
private int _serverVersion = 0;                 1300b
public int getServerVersion()
{
        return _serverVersion;
}
```

FIG. 13

```
[ ON
        [ PRIMARY ] <filespec> [ ,...n ]
        [ , <filegroup> [ ,...n ] ]
        [ LOG ON <filespec> [ ,...n ] ]
]
Where <filespec> is defined as:

<filespec> ::=
{
(
        NAME = logical_file_name ,
        FILENAME = { 'os_file_name' | 'filestream_path' }
        [ , SIZE = size [ KB | MB | GB | TB ] ]
        [ , MAXSIZE = { max_size [ KB | MB | GB | TB ] | UNLIMITED } ]
        [ , FILEGROWTH = growth_increment [ KB | MB | GB | TB | % ] ]
)
}
```

SYSTEMS AND METHODS FOR IDENTIFYING COMMON COMPONENTS ACROSS SQL PARSER DIALECTS

CROSS-REFERENCE TO RELATED APPLICATIONS AND CLAIM PRIORITY

This application claims the benefit of U.S. Provisional Application No. 62/888,338, filed Aug. 16, 2019, the content of which are fully incorporated herein by reference in its entirety.

BACKGROUND

Structured query language (SQL) is a programming language used for maintaining data in relational databases. Relational databases rely upon parsed SQL statements for translating incoming information into outputs that various types of databases and application software can understand and process. Such databases and application software can use the translated or parsed information for various purposes and tasks including but not limited to, reverse engineering, forward engineering, code completion, script optimization, and so on. For example, a user can enter first SQL statements of a first type (e.g., MySQL® statements) to request a parser to return all tables from the first SQL statements. The parser can parse the first SQL statements, process the parsed first SQL statements, and pull those tables out of a database. The user can also enter second SQL statements of a second type (e.g., Oracle® statements) to request the parser to return all tables from the second SQL statements. The parser can parse the second SQL statements, process the parsed second SQL statements, and pull those tables out the database.

The above information disclosed in this Background section is for enhancement of understanding of the background of the invention, and therefore, it can contain information that does not constitute prior art.

SUMMARY

Example embodiments relate to a method that includes generating a representation of each of a plurality of dialects of structured query language (SQL) statements, and receiving a first SQL statement. The first SQL statement is in a first dialect of the plurality of dialects. The method further includes generating a first output corresponding to the first SQL statement. The first output has a plurality of first data structures arranged in a first tree structure. Each of the plurality of first data structures corresponds to a portion of the first SQL statement. The method further includes receiving a second SQL statement. The second SQL statement is in a second dialect of the plurality of dialects. The method further includes generating a second output corresponding to the second SQL statement. The second output has a plurality of second data structures arranged in a second tree structure. Each of the plurality of second data structures corresponds to a portion of the second SQL statement, where a first data structure of the plurality of first data structures is the same as a second data structure of the plurality of second data structures.

In further examples of the above method, the first SQL statement and the second SQL statement have different syntaxes.

In further examples of the above method, generating the representation of each of the plurality of dialects of SQL statements includes generating grammar rules for the SQL statements of each of the plurality of dialects based on a syntax diagram for each of the plurality of dialects, and the grammar rules are specific to each of the plurality of dialects.

In further examples of the above method, the grammar rules include lexer rules used to identify keywords in the syntax diagram and tokenize the keywords as tokens, and parser rules used to combine the tokens to form a parse tree, wherein the representation corresponds to the parse tree.

In further examples of the above method, each of the tokens includes a unique lexer identifier (ID) and annotations corresponding to the unique lexer ID.

In further examples of the above method, generating the representation of each of the plurality of dialects of SQL statements further comprises converting the syntax diagram for each of the plurality of dialects into a parse tree based on the grammar rules.

Further examples of the above method also include receiving a first platform indicator with the first SQL statement, the first platform indicator identifies the first dialect, and receiving a second platform indicator with the second SQL statement, the second platform indicator identifies the second dialect.

In further examples of the above method, generating the first output corresponding to the first SQL statement includes identifying a first parse tree for the first dialect based on the first platform indicator, and generating the second output corresponding to the second SQL statement includes identifying a second parse tree for the second dialect based on the second platform indicator.

Further examples of the above method also include generating a first annotated parse tree based on the first parse tree and the first SQL statement, and generating a second annotated parse tree based on the second parse tree and the second SQL statement.

Further examples of the above method also include generating a first application protocol interface (API) tree based on the first annotated parse tree, and generating a second API tree based on the second annotated parse tree.

In further examples of the above method, the first tree structure comprises the first API tree, the plurality of first data structures comprise interfaces of the first API tree, the second tree structure comprises the second API tree, and the plurality of second data structures comprise interfaces of the second API tree.

Further example embodiments relate to a non-transitory computer-readable medium having computer-readable instructions such that, when executed by a processor, causes the processor to generate a representation of each of a plurality of dialects of structured query language (SQL) statements. The computer-readable instructions, when executed by a processor, further causes the processor to receive a first SQL statement, the first SQL statement is in a first dialect of the plurality of dialects, and generate a first output corresponding to the first SQL statement. The first output includes a plurality of first data structures arranged in a first tree structure. Each of the plurality of first data structures corresponds to a portion of the first SQL statement. The computer-readable instructions, when executed by a processor, further causes the processor to receive a second SQL statement. The second SQL statement is in a second dialect of the plurality of dialects. The computer-readable instructions, when executed by a processor, further causes the processor to generate a second output corresponding to the second SQL statement. The second output includes a plurality of second data structures arranged in a second tree structure, where each of the plurality of second data structures corresponds to a portion of the second SQL statement, and where a first data structure of the plurality of first data structures is the same as a second data structure of the plurality of second data structures.

In further examples of the non-transitory computer-readable medium, the first SQL statement and the second SQL statement have different syntaxes.

In further examples of the non-transitory computer-readable medium, generating the representation of each of the plurality of dialects of SQL statements includes generating grammar rules for the SQL statements of each of the plurality of dialects based on a syntax diagram for each of the plurality of dialects, and the grammar rules are specific to each of the plurality of dialects.

In further examples of the non-transitory computer-readable medium, the grammar rules include lexer rules used to identify keywords in the syntax diagram and tokenize the keywords as tokens, and parser rules used to combine the tokens to form a parse tree, wherein the representation corresponds to the parse tree.

In further examples of the non-transitory computer-readable medium, each of the tokens includes a unique lexer identifier (ID) and annotations corresponding to the unique lexer ID.

In further examples of the non-transitory computer-readable medium, generating the representation of each of the plurality of dialects of SQL statements further includes converting the syntax diagram for each of the plurality of dialects into a parse tree based on the grammar rules.

In further examples of the non-transitory computer-readable medium, the computer-readable instructions, when executed by a processor, further causes the processor to receive a first platform indicator with the first SQL statement, where the first platform indicator identifies the first dialect, and receive a second platform indicator with the second SQL statement, where the second platform indicator identifies the second dialect.

In further examples of the non-transitory computer-readable medium, generating the first output corresponding to the first SQL statement includes identifying a first parse tree for the first dialect based on the first platform indicator, and generating the second output corresponding to the second SQL statement includes identifying a second parse tree for the second dialect based on the second platform indicator.

In further examples of the non-transitory computer-readable medium, the computer-readable instructions, when executed by a processor, further causes the processor to generate a first annotated parse tree based on the first parse tree and the first SQL statement, and generate a second annotated parse tree based on the second parse tree and the second SQL statement.

In further examples of the non-transitory computer-readable medium, the computer-readable instructions, when executed by a processor, further causes the processor to generate a first application protocol interface (API) tree based on the first annotated parse tree, and generate a second API tree based on the second annotated parse tree.

In further examples of the non-transitory computer-readable medium, the first tree structure includes the first API tree, the plurality of first data structures include interfaces of the first API tree, the second tree structure includes the second API tree, and the plurality of second data structures include interfaces of the second API tree.

Further example embodiments relate to a system, including a memory unit; and a processor configured to generate a representation of each of a plurality of dialects of structured query language (SQL) statements. The processor is further configured to receive a first SQL statement. The first SQL statement is in a first dialect of the plurality of dialects, and generate a first output corresponding to the first SQL statement. The first output includes a plurality of first data structures arranged in a first tree structure. Each of the plurality of first data structures corresponds to a portion of the first SQL statement. The processor is further configured to receive a second SQL statement. The second SQL statement is in a second dialect of the plurality of dialects. The processor is further configured to generate a second output corresponding to the second SQL statement. The second output includes a plurality of second data structures arranged in a second tree structure. Each of the plurality of second data structures corresponds to a portion of the second SQL statement. A first data structure of the plurality of first data structures is the same as a second data structure of the plurality of second data structures.

BRIEF DESCRIPTION OF THE DRAWINGS

FIG. 4 is a diagram illustrating SQL statements in various dialects, according to some examples.

FIG. 6 is an example syntax diagram for a dialect, according to some examples.

FIG. 7 is a diagram illustrating lexer rules, according to some examples.

FIG. 8 is a diagram illustrating parser rules, according to some examples.

FIGS. 9A-9E are diagrams illustrating an example parse tree, according to some examples.

FIGS. 10A and 10B are diagrams illustrating an example annotated parse tree, according to some examples.

FIGS. 11A and 11B are diagrams illustrating an example API tree, according to some examples.

FIGS. 12A-12C are diagrams illustrating a definition of functions of helper methods, according to some examples.

FIG. 13 illustrates an example implementation of the API interface definition in C++ and an example implementation of the API interface definition in Java, according to some examples FIG. 14 illustrates a portion of a syntax diagram, according to some examples.

DETAILED DESCRIPTION

Figure 1:
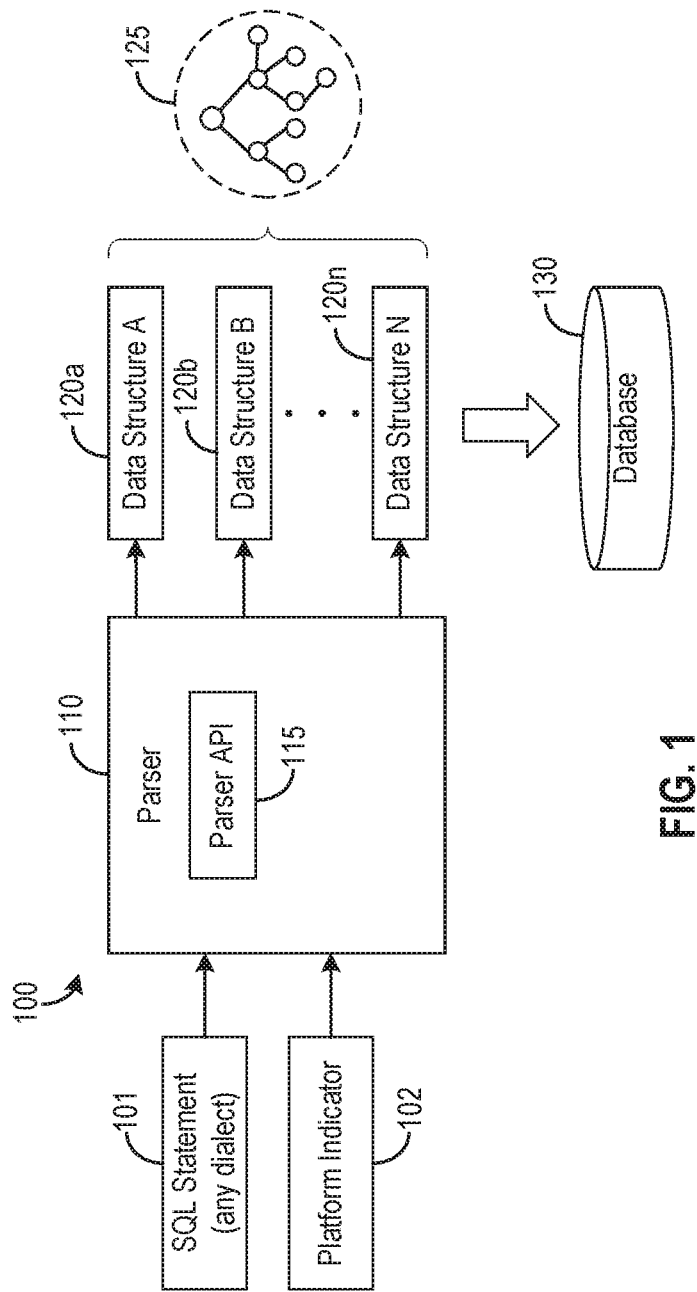
FIG. 1 is a block diagram illustrating a database system, according to some examples.

Hereinafter, example implementations will be described in more detail with reference to the accompanying drawings, in which like reference numbers refer to like elements throughout. The present invention, however, can be embodied in various different forms, and should not be construed as being limited to only the illustrated examples herein. Rather, these examples are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention cannot be described. Unless otherwise noted, like reference numerals denote like elements throughout the attached drawings and the written description.

Arrangements described herein relate to systems, methods, apparatuses, and non-transitory computer-readable media for a parser application programing interface (API) that allows a user to feed, to the parser API, SQL statements of any SQL dialect, and the parser API can return a uniform infrastructure to the user in a normalized pattern. This allows various types of databases and application software to understand any SQL dialect in a generic and portable format. The uniform infrastructure corresponds to a token tree structure. For example, the disclosed parser API comprehensively and bilaterally translate between SQL query statements (or SQL statements) and the token tree structure that represents the SQL query corresponding to the SQL query statements. The parser API divides an unparsed SQL statement, identifies one or more structures in the unparsed SQL statement, and separates those structures into dedicated data structures in the token tree structure. A data structure that is a common construct across different vendors or platforms (e.g., My SQL®, Oracle®, and SQL Server®, and so on) is identified by a unique identifier (ID) and is accessible across all vendors. Accordingly, the disclosed parser API allows a relational database to understand, in a single consistent format, SQL queries across multitudes of platforms.

A SQL statement (or SQL query statement) corresponds to computer language that includes alphanumeric characters and symbols indicating an action or task (e.g., reverse engineering, forward engineering, code completion, script optimization, and so on) to be performed with respect to a relational database. As used herein, a dialect of SQL statements refers to a particular syntax, grammar, rules, organization, arrangement, layout, order, sequence, and/or other characteristics of SQL statement relating to the manner in which the SQL statements are written. Syntax refers to grammar rules or structures used for assembling the SQL characters to form a SQL statement. Dialects are platform-specific, and each platform can have its own unique dialect that is different from dialects of other platforms. That is, two SQL statements for two different platforms appear differently with regard to one or more of syntax, grammar, organization, arrangement, layout, and so on, even though those SQL statements invoke a same task to be performed with respect to a database (e.g., retrieving the same information from the database, updating the same data in the database, and so on).

Various different applications for and features of relational databases are multi-platform, meaning that the applications and features can process SQL statements from multiple different platforms/vendors. Accordingly, the implementations described herein allow a multi-platform application or feature to process the uniform infrastructure (e.g., the token tree structure) instead of the SQL statements from multiple platforms that have different dialects.

In some examples, an application can generate an output based on a portion (or segment) of a SQL statement. For example, an optimizer application can "tune" a SQL statement by analyzing the SQL statement and suggest improvements to the SQL statement (e.g., adding hints to the SQL statement) to optimize the SQL statement. Such an optimizer application needs to segment the SQL statement into various portions and analyze each portion, in order to suggest improvements. Accordingly, such optimizer applications can tune normalized outputs (e.g., dedicated data structures in the token tree structure) of the parser instead of SQL statements of various different dialects.

In another example, a database application can execute scripts having a large number of SQL statements separated by batch separators, each of which separates one set of SQL statements from another set of SQL statements. Each separator can be one or more valid SQL characters (e.g., alphanumeric characters and symbols), therefore the separators are also portions of the SQL statements. Each separate is a portion of a SQL statement. Accordingly, such a database application can identify separators in a script having a large number of SQL statements (regardless of which dialect those SQL statements are in) using the normalized outputs (e.g., dedicated data structures in the token tree structure) of the parser, given that a construct (e.g., separator) common across different platforms are identified by a same unique ID.

In yet another example, an editor can allow suggestions based on context. As a user is inputting information (e.g., a front clause in SQL characters) in the editor, the editor can recommend additional input that follows the information based on the context. The inputted information is a portion of a SQL statement. Accordingly, such an editor can identify the inputted information (regardless of which dialect the inputted information is in) using the normalized outputs (e.g., dedicated data structures in the token tree structure) of the parser, given that a construct common across different platforms are identified by a same unique ID.

In yet another example, a database application uses a parser to obtain information on certain properties of a SQL statement. The parser identifies portions of the SQL statement and analyze those portions to identify properties of the portions. In yet another example, a database application can reverse engineer and/or forward engineer databases by reading SQL statements and output information corresponding to the SQL statements in a manner that various software applications can understand. Accordingly, such a database application can identify the various portions of the SQL statement (regardless of which dialect the SQL statement is in) using the normalized outputs (e.g., dedicated data structures in the token tree structure) of the parser, given that a construct common across different platforms are identified by a same unique ID.

In some examples, two or more applications can use different portions of the same SQL statement as inputs and generate outputs based on the respective ones of those portions. The outputs can be stringed together for further processing or actions.

FIG. 1 is a schematic diagram illustrating a database system 100 according to some examples. Referring to FIG. 1, the database system 100 includes a parser 110 and a database 130. The parser 110 manipulates or prepares SQL statements (e.g., a SQL statement 101) to be executed by or with respect to the database 130. The database 130 is any suitable relational database.

For example, the parser 110 can divide the SQL statement 101. That is, the parser 110 takes apart portions of a SQL statement and identify what these portions are. For example, the SQL statement 101 can be separated such that a first portion of the SQL statement 101 corresponds to data structure A 120$a$, a second portion of the SQL statement 101 corresponds to data structure B 120$b$, . . . , an n$^{th}$ portion of the SQL statement 101 corresponds to data structure N 120$n$. While n data structures 120$a$-120$n$ are shown in FIG. 1, any number of data structures can be outputted for any given SQL statement 101, depending on the content of the SQL statement 101.

The parser 110 includes a parser API 115 configured to facilitate the parser 110 to divide the unparsed SQL statement 101, to identify one or more structures in the unparsed SQL statement 101, and to separate those structures into dedicated data structures (e.g., the data structures 120a-120n) in a token tree structure 125. A portion of a non-limiting example of the token tree structure 125 for a "Select" SQL statement (as the SQL statement 101) is shown below.

```
...
Select Statement
    Select Clause
        Column
    From Clause
        Table
    Where Clause
...
```

As shown, the token tree structure 125 can have a parent-child, node-like structure. For example, a combination of "Select Statement," "Select Clause," "Column," "From Clause," "Table," and "Where Clause" is a fragment that is arranged as nodes of the token tree structure 125. Each of "Select Statement," "Select Clause," "Column," "From Clause," "Table," and "Where Clause" is a token that is a data structure that corresponds to a respective one of various portions of the "Select" SQL statement. As such, the "Select" SQL statement corresponds to a "Select" fragment. "Select Statement" is a parent node of "Select Clause," "From Clause," and "Where Clause." "Select Clause," "From Clause," and "Where Clause" are child nodes or sub-fragments (or tokens) of "Select Statement." Child nodes of the same node are on a same level, denoted using the same indentation in the token tree structure 125. For example, "Select Clause," "From Clause," and "Where Clause" are the child nodes of the same node ("Select Statement") and are on the same level (have the same indentation). "Column" is the child node of "Select Clause" and the grandchild node of "Select Statement." Accordingly, a first node with increased indentation as compared to the indentation of a second node immediately before (above) the first node denotes that the first node is a child node of the second node, and that the second node is the parent node of the first node. Fragments maps one-to-one with interfaces described herein.

As described in further details herein, each of the data structures 120a-120n is a dedicated data structure that can be identified by an ID. Data structures that are common across different dialects are identified by a same unique ID.

In addition to the SQL statement 101, a platform indicator 102 for the SQL statement 101 can also be sent to the parser 110 (the parser API 115). The platform indicator 102 identifies a platform from which the SQL statement 101 is received, or identifies a platform for which the SQL statement 101 is generated. In other words, the SQL statement 101 is in the dialect of the platform identified by the platform indicator 102.

The parser 110 can receive SQL statements of various dialects corresponding to different platforms. As such, the SQL statement 101 can be in any dialect. Regardless of the dialect in which the SQL statement 101 is, the parser 110 (as facilitated by the parser API 115) can generate normalized outputs from the SQL statement 101, where the normalized outputs are the data structures 120a-120n in the token tree structure 125. A construct common across different dialects are identified by a same unique ID. That is, two SQL statements in two different dialects that invoke a same task to be performed with respect to a database (e.g., retrieving the same information from the database, updating the same data in the database, and so on) will have the same output (e.g., the same token tree structure 125 and the same data structures 120a-120n), even though the unparsed SQL statements themselves appear differently with regard to one or more of syntax, grammar, organization, arrangement, layout, and so on.

The data structures 120a-120n in the token tree structure 125 can be consumed by other applications or features of the database 130. For example, an optimizer application can tune the dedicated data structures 120a-120n in the token tree structure 125 instead of SQL statements of various different dialects. A database application can identify separators in a script having a large number of SQL statements (regardless of which dialect those SQL statements are in) using the data structures 120a-120n in the token tree structure 125, in the example in which the SQL statement 101 represents the large number of SQL statements. An editor can identify the information inputted by a user (regardless of which dialect the inputted information is in) using the data structures 120a-120n in the token tree structure 125. A database application can identify the various portions of the SQL statement 101 (regardless of which dialect the SQL statement 101 is in) using the data structures 120a-120n in the token tree structure 125.

Figure 2:
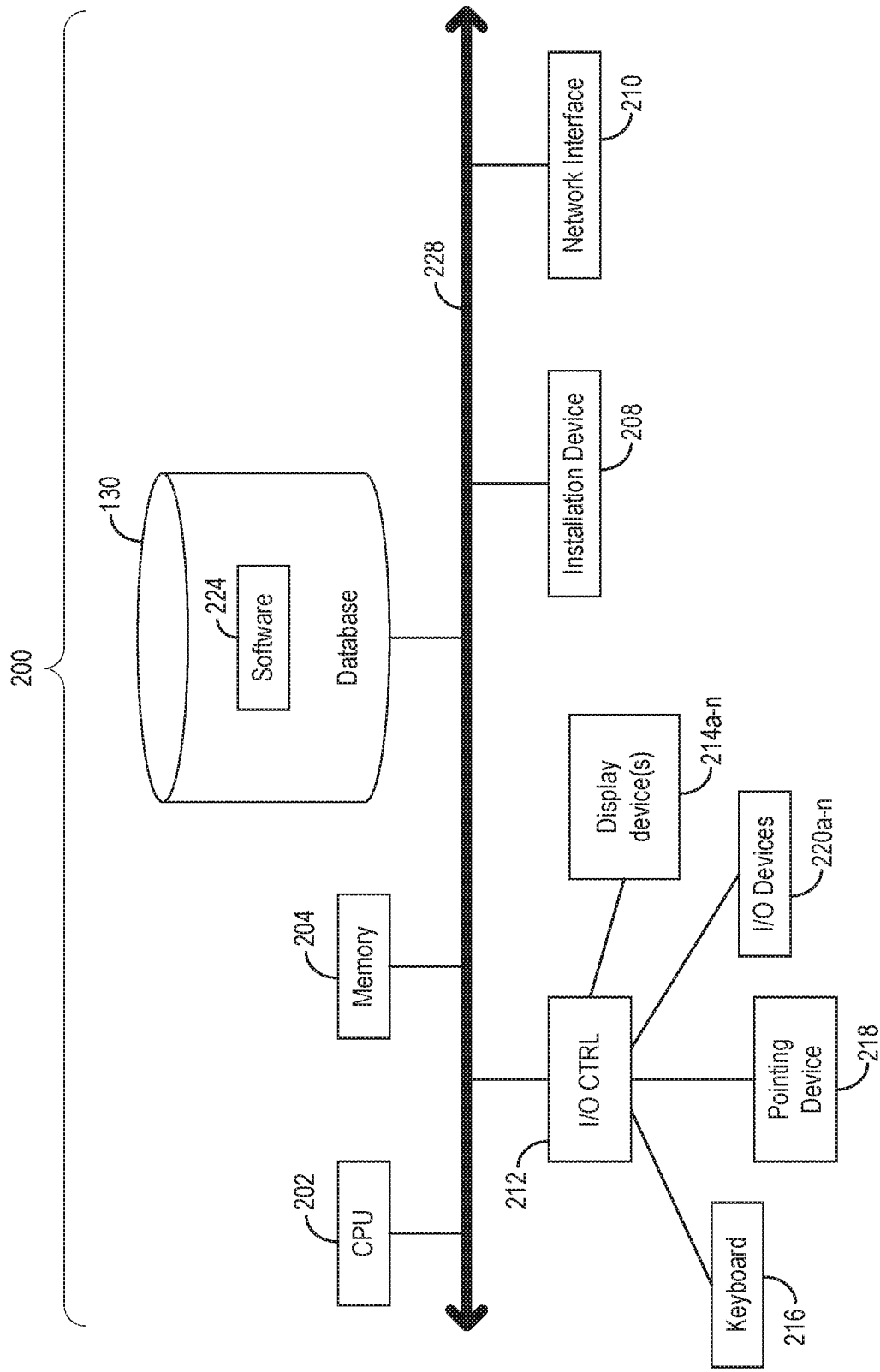
FIG. 2 is a block diagram depicting a computing device used to implement the database system of FIG. 1, according to some examples.

FIG. 2 is a block diagram depicting a computing device 200 used to implement the database system 100 of FIG. 1, according to some examples. Referring to FIGS. 1-2, the computing device 200 can be used to implement one or more disclosed features of the database system 100. As shown in FIG. 2, in some examples, the computing device 200 includes a central processing unit (CPU) 202, a memory unit 204, the database 130, an installation device 208, a network interface 210, an input/output (I/O) controller 212, one or more display devices 214 (e.g., 214a-214n), a keyboard 216, and a pointing device 218 (e.g., a mouse). The database 130 can include, without limitation, software 224. The computing device 200 can also include additional optional elements, for example, such as a memory port, a bridge, one or more input/output devices 220 (e.g., 220a-220n), and cache memory in communication with the CPU 202.

In some examples, the CPU 202 can be any suitable logic circuitry that responds to and processes instructions fetched from the memory unit 204. In some examples, the CPU 202 is provided by a microprocessor unit. For example, in some examples, the microprocessor unit can include one or more microprocessors manufactured by Intel Corporation of Mountain View, Calif., Motorola Corporation of Schaumburg, Ill., the ARM processor and TEGRA system on a chip (SoC) manufactured by Nvidia of Santa Clara, Calif., the POWER7 processor, those manufactured by International Business Machines of White Plains, N.Y., and/or by Advanced Micro Devices of Sunnyvale, Calif. The computing device 200 can be based on any of these processors, or any other suitable processor capable of operating as described herein. In various examples, the CPU 202 can utilize instruction level parallelism, thread level parallelism, different levels of cache, and/or multi-core processors. A multi-core processor can include two or more processing units on a single computing component. Examples of a multi-core processors include the AMD PHENOM IIX2, INTEL CORE i5 and INTEL CORE i7.

In some examples, the memory unit 204 can include one or more memory chips capable of storing data and allowing any storage location to be directly accessed by the CPU 202. In various examples, the memory unit 204 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), and/or Extreme Data Rate DRAM (XDR DRAM). In some examples, the memory unit 204 or the database 130 can be non-volatile memory, for example, such as non-volatile read access memory (NVRAM), flash memory non-volatile static RAM (nvSRAM), Ferroelectric RAM (FeRAIVI), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), and/or Millipede memory. The memory unit 204 can be based on any of the above described memory chips, or any other available memory chips capable of operating as described herein. In some examples, the CPU 202 communicates with the memory unit 204 via a system bus 228 (described in more detail below). In other examples, the CPU 202 can communicate directly with the memory unit 204 via a memory port.

In some examples, the CPU 202 can communicate directly with cache memory via a secondary bus, sometimes referred to as a backside bus. In other examples, the CPU 202 can communicate with cache memory using the system bus 228. Cache memory typically has a faster response time than the memory unit 204, and is typically provided by SRAM, BSRAM, or EDRAM. In some examples, the CPU 202 communicates with various I/O devices 220 via a local system bus (e.g., the system bus 228). Various buses can be used to connect the CPU 202 to any of the I/O devices 220, including a PCI bus, a PCI-X bus, or a PCI-Express bus, or a NuBus. In examples in which the I/O devices 220 include a video display device 214, the CPU 202 can use an Advanced Graphics Port (AGP) to communicate with the display device 214 or the I/O controller 212 for the display device 214.

In some examples, the CPU 202 can execute the functions of the parser 110 and the parser API 115. That is, the parser 110 and the parser API 115 can be software instructions stored in the memory 204 to be implemented by the CPU 202. The SQL statement 101 and the platform indicator 102 can be received by the CPU 202 locally from other software applications of the computing system 200. Alternatively, SQL statement 101 and the platform indicator 102 can be received via the network interface 210 from another computing system over a network, and the network interface 210 can send the SQL statement 101 and the platform indicator 102 to the CPU 202 via the bus 228. The data structures 120a-120n (in a token tree structure 125) as generated by the CPU 202 can be sent to the software 224 via the bus 228.

In various examples, a wide variety of I/O devices 220a-220n can be included in the computing device 200. For example, in various examples, the input devices of the I/O devices 220a-220n can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various examples, the output devices of the I/O devices 220a-220n can include, for example, video displays, graphical displays, speakers, headphones, inkjet printers, laser printers, and/or 3D printers.

In some examples, I/O devices 220a-220n can include a combination of multiple input or output devices, such as, for example, Microsoft KINECT, Nintendo Wiimote for the WII, Nintendo WII U GAMEPAD, Apple IPHONE, Android based smart phones, and/or the like. In some examples, some of the I/O devices 220a-220n can allow gesture recognition inputs through a combination of some of the inputs and outputs. In some examples, some of the I/O devices 220a-220n can provide for facial recognition, which can be utilized as an input for different purposes including authentication and other commands. In some examples, some of the I/O devices 220a-220n can provide for voice recognition and inputs, such as, for example, Microsoft KINECT, SIRI for IPHONE by Apple, Google Now or Google Voice Search, and/or the like.

In some examples, addition I/O devices 220a-220n can have both input and output capabilities, including, for example, haptic feedback devices, touchscreen displays, multi-touch displays, and/or the like. Touchscreen, multi-touch displays, touchpads, touch mice, or other touch sensing devices can use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices can allow two or more contact points with the surface, allowing advanced functionality including, for example, pinch, spread, rotate, scroll, and/or other gestures. Some touchscreen devices, including, for example, Microsoft PIXELSENSE and Multi-Touch Collaboration Wall, can have larger surfaces, such as on a table-top or on a wall, and can also interact with other electronic devices. In some examples, some of the I/O devices 220a-220n, display devices 214a-214n, or group of devices can be augment reality devices. In some examples, the I/O devices (e.g., keyboard 216, pointing device 218, display devices 214, and/or I/O devices 220) can be controlled by the I/O controller 212. In some examples, an I/O device can also provide storage and/or an installation medium (e.g., installation device 208) for the computing device 200. In still other examples, the computing device 200 can provide USB connections to receive handheld USB storage devices. In further examples, an I/O device 220 can be a bridge between the system bus 228 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some examples, the display devices 214a-214n can be connected to the I/O controller 212. In various examples, the display devices 214a-214n can include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays can include, for example, stereoscopy, polarization filters, active shutters, autostereoscopy, and/or the like. Display devices 214a-214n can also include a head-mounted display (HMD). In some examples, display devices 214a-

214*n* or the corresponding I/O controllers 212 can be controlled through or have hardware support for OPENGL, DIRECTX API, and/or other graphics libraries.

In some examples, the database 130 (e.g. one or more hard disk drives or redundant arrays of independent disks) can store other related software (e.g., software 224) such as any program that can consume the data structures 120*a*-120*n* in the token tree structure 125. For example, examples of the software 224 include but are not limited to, the optimizer application, the database application, the editor, and so on. While the software 224 is shown to be implemented as part of the database 130, the software 224 can likewise be implemented by the CPU 202 and the memory unit 204.

Examples of hardware implementing the database 130 can include hard disk drive (HDD), optical drive including CD drive, solid-state drive (SSD), USB flash drive, and/or any other suitable device for storing data. In one example, the database 130 includes multiple volatile and non-volatile memories such as but not limited to, solid state hybrid drives that combine hard disks with solid state cache. In one example, the database 130 includes non-volatile, mutable, and/or read-only. In one example, the database 130 includes internal and can connect to the computing device 200 via the bus 228. Some storage devices 106 can be external and can be connect to the computing device 200 via the I/O device 220 that provides an external bus. In one example, the database 130 connects to the computing device 200 via the network interface 210 over a network.

In some examples, the computing device 200 can also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform can facilitate installation of software on the computing device 200. An application distribution platform can include a repository of applications on a server or a cloud, which the computing device 200 can access over a network (e.g., the Internet). An application distribution platform can include application developed and provided by various developers. A user of the computing device 200 can select, purchase, and/or download an application via the application distribution platform.

In some examples, the computing device 200 can include the network interface 210 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11/b/g/n/ac CDMA, GSM, WiMax and direct asynchronous connections). In one example, the computing device 200 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some examples, the network interface 210 can include, for example, a built-in network adapter, network interface card, PCMCIA network card, EXPRESSCARD network card, card bus network adapter, wireless network adapter, USB network adapter, modem, and/or any other suitable device for interfacing the computing device 200 to any type of network capable of communication and performing the operations described herein.

In various examples, the computing device 200 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, and/or any other suitable type and/or form of computing, telecommunications, or media device that is capable of communication. The computing device 200 has sufficient processor power and memory capacity to perform the operations described herein. In some examples, the computing device 200 can have different processors, operating systems, and input devices consistent with the device.

While some non-limiting examples of various computing devices 100 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

Figure 3:
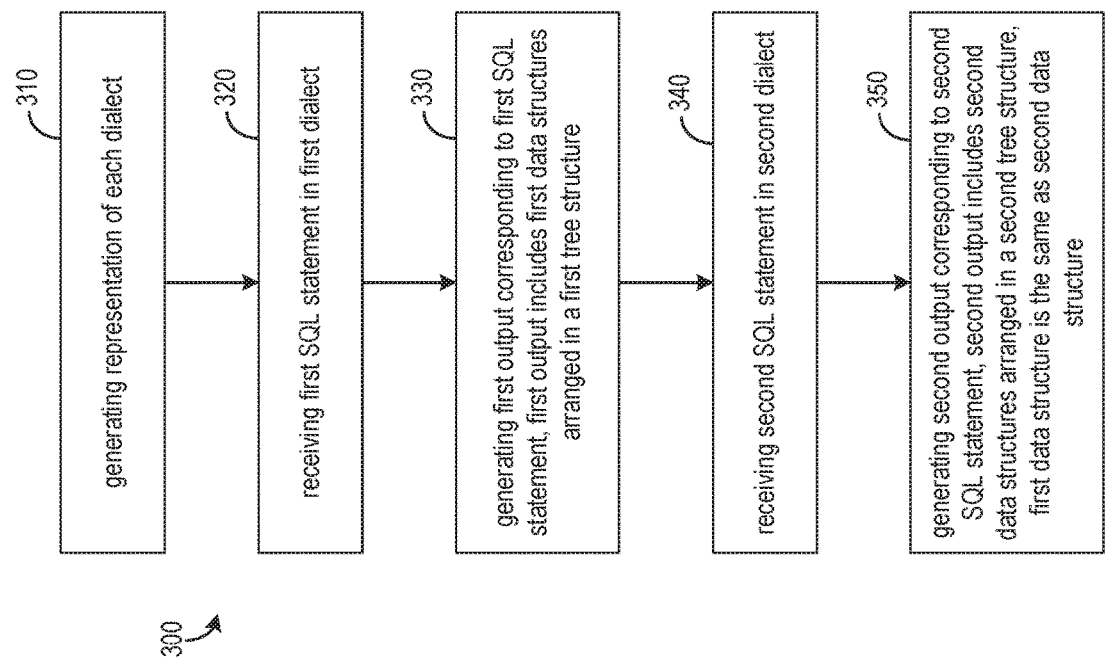
FIG. 3 is a flow diagram illustrating an example method for parsing SQL statements, according to some examples.

FIG. 3 is a flow diagram illustrating an example method 300 for parsing SQL statements, according to some examples. Referring to FIGS. 1-3, the method 300 can be performed by the parser 110 (e.g., the parser API 115). At 310, a representation of each of a plurality of dialects of SQL statements is generated.

At 320, a first SQL statement is received. The first SQL statement is in a first dialect of the plurality of dialects. At the same time, a first platform indicator (e.g., the platform indicator 102) can be received. The platform indicator indicates the platform (and therefore the dialect) from which the first SQL statement is generated. The first SQL statement and the first platform indicator can be received from any suitable application.

At 330, a first output corresponding to the first SQL statement is generated. The first output includes a plurality of first data structures arranged in a first tree structure. The first tree structure can be the token tree structure 125. The first data structures can be the data structures 120*a*-120*n*. Each of the plurality of first data structures corresponds to a portion of the first SQL statement.

At 340, a second SQL statement is received. The second SQL statement is in a second dialect of the plurality of dialects. The first and second dialects are different and are used by different platforms. At the same time, a second platform indicator (e.g., the platform indicator 102) can be received. The platform indicator indicates the platform (and therefore the dialect) from which the second SQL statement is generated. The first platform indicator and the second platform indicator identify different platforms. The second SQL statement and the second platform indicator can be received from any suitable application.

At 350, a second output corresponding to the second SQL statement is generated. The second output includes a plurality of second data structures arranged in a second tree structure. Each of the plurality of second data structures corresponds to a portion of the second SQL statement.

A first data structure of the plurality of first data structures is the same as a second data structure of the plurality of second data structures. The first data structure corresponds to a portion of the first SQL statement that invoke a same task to be performed with respect to the database 130 as the task invoked by a portion of the second SQL statement that corresponds to the second data structure. As described, given that the first SQL statement and the second SQL statement are in different dialects, the SQL characters of the portion of the first SQL statement and the SQL characters of the portion of the second SQL statement appear to be different (e.g., have different syntax, grammar, organization, arrangement, layout, and so on). As the first SQL statement and the second SQL statement invoke the same task, the first data structure and the second data structure are the same and are identified by a same ID.

FIG. 4 is a diagram illustrating SQL statements 400a-400c in various dialects, according to some examples. Referring to FIGS. 1-4, the SQL statement 400a is in a first dialect for a first platform (SQL Server®). The SQL statement 400b is in a second dialect for a second platform (Oracle®). The SQL statement 400c is in a third dialect for a third platform MySQL®. Each of the SQL statements 400a-400c is a select statement that gathers information such as "Time," "Subject," "Value," "First Value," "Last Value," "Cumulative Distribution (by Range)," and "Percent Rank" from the database 130. The SQL statements 400a-400c perform the same task, which is retrieving the same information from the database 130, and have the same output (e.g., the columns requested by the statement) from the parser 110. As shown, the SQL statements 400a-400c have different syntax, grammar, organization, arrangement, layout, and so on. That is, the SQL characters of the SQL statements 400a-400c appear differently, as shown.

Figure 5:
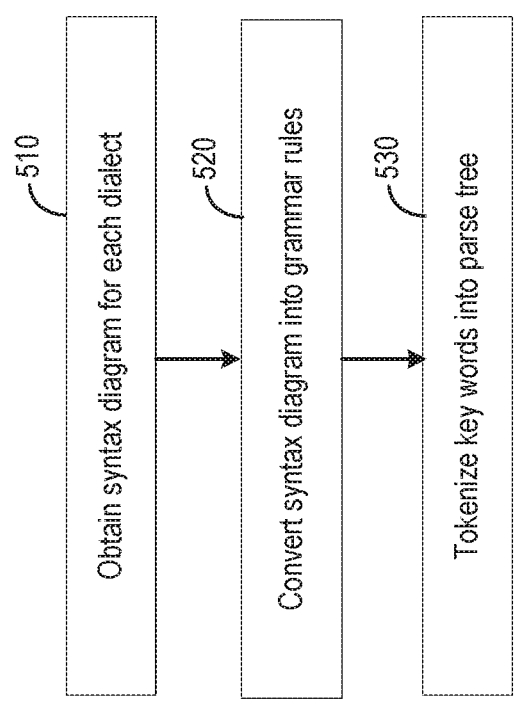
FIG. 5 is a flow diagram illustrating an example method for generating a representation of each of a plurality of dialects of SQL statements, according to some examples.
Figure 9D:

FIG. 5 is a flow diagram illustrating an example method 500 for generating a representation of each of a plurality of dialects of SQL statements, according to some examples. Referring to FIGS. 1-5, the method 500 is an example implementation of block 310 of the method 300. The representation refers to a tree representation, which is referred to as a parse tree. That is, the parse tree is formed for each of the dialects available for use. The parse tree is different from the token tree structure 125. The parse tree is used as a roadmap to generate the token tree structure 125 for any SQL statement in any dialect. The method 500 is performed by the parser API 115. The method 500 is performed for each dialect, the SQL statements of which are received by the parser 110.

At 510, a syntax diagram for each dialect is obtained. A syntax diagram for a dialect is a diagram that illustrates how to form a SQL statement with the correct syntax in that dialect. Syntax diagrams are different for different dialects. The typical use of a syntax diagram is a guide for users to form syntax-correct SQL statements in a particular dialect. The syntax diagrams (and updates thereof) are platform-specific and can be received automatically from resources (e.g., websites, downloadable files, and so on) of the respective platforms. Alternatively, an operator can manually load the syntax diagram into a suitable storage device (e.g., the memory 204) to be used by the parser API 115. FIG. 6 is an example syntax diagram 600 for a dialect of SQL statements (SQL Server®), according to some examples. The syntax diagram 600 includes characters and symbols, and leaves placeholders for a user to fill in characters pertaining to particular SQL statements to be formed by the user.

At 520, syntax diagram for each dialect is converted into grammar rules. In other words, the parser API 115 can comb through the information provided by the syntax diagram and petition the syntax diagram into pieces, and organize the pieces in a meaning arrangement to form the grammar rules. The grammar rules include lexer rules and parser rules, in some examples.

In some implementations, lexer rules can be used to identify keywords in the syntax diagrams and to tokenize those keywords into the parse tree. Each identified keyword is tokenized, meaning each identified keyword is given a unique lexer ID or tag by a lexer of the parser API 115. This allows the parser 110 to process the lexer IDs instead of characters and words in the syntax diagram. In that regard, the lexer rules define tokenization, such that a token includes a unique lexer ID assigned to each keyword in the syntax diagram and annotations. In some examples, annotations refer to a classification of the item identified by the unique lexer ID. Examples of classifications include but are not limited to, keywords, identifiers, and so on. In that regard, FIG. 7 is a diagram illustrating lexer rules 700, according to some examples. The lexer rules 700 are for identifying keywords in a syntax diagram of a particular dialect that pertains to select statements.

In some implementations, parser rules define the manner in which keywords are combined to form the parse tree, such that the parse tree corresponds to a tree representation of the syntax diagram and includes the unique lexer IDs and the annotations. The parser rules define a statement type based on the order or arrangement of the lexer ID, e.g., if particular lexer IDs are organized in this order, then a SQL statement is of a particular type. SQL statements of a same type invoke a same task, function, or feature. FIG. 8 is a diagram illustrating parser rules 800, according to some examples.

At 530, the keywords are tokenized to form the parse tree. FIGS. 9A-9E are diagrams illustrating an example parse tree 900, according to some examples. Referring to FIGS. 1-9E, the unquoted words or characters in the parse tree 900 are the unique lexer IDs defined by the lexer rules. The values of the lexer IDs and naming of the lexer IDs are specific to a dialect and have a close correspondence to the syntax diagram of that dialect. Quoted words or characters are lexer tokens that are part of what the rule captured. The grammar rules that produce the parse tree 900 is specific to the platform and the syntax diagram thereof, thus, different platforms may not use the same lexer tokens or have the same syntax for the parse tree.

The parse tree 900 can further includes annotations (not shown in FIGS. 9A-9E). Annotations can be used to search for the unique lexer IDs. In some examples, the parser 110 can annotate certain tokens with a class type. For an example select statement:

select*/*comment*/from aschema.atable as twhere
  a=1;

The unique lexer IDs can give a token a "Token Class" annotation. In the example select statement, "select" is given a "KEYWORD" token class value, and "/*comment*1" is given a "MULTI_LINE_COMMENT" token class value. A token that is not a part of any special token class value is given a "TOKEN" token class value, which is a default class value. The token class value can be used to distinguish certain tokens from other tokens. An example related to the usage of "Token Class" annotation is a case in which a user wants to remove all comments. Using the "Token Class" annotation, the user can request all SINGLE_LINE_COMMENT and MULTI_LINE_COMMENT fragments, and then remove those fragments from the tree. The user can then request the root to return the SQL text having all comments removed.

In some examples, the parser 110 can annotate certain tokens with a "SQL Type" annotation. Such annotation can be given by flagging a token as "special" in the grammar, and these flags can be later searched to facilitate annotating the token. In the example select statement, "*" is given the "STAR SQL" type value, a schema is given the "SCHEMA SQL" type value, and a table is given the "TABLE SQL" value type. This can also be used to differentiate certain tokens from others. An example related to the usage of "SQL Type," a fragment "aschema.atable as t" is a "TABLEREFERENCE" fragment type. A user can easily request all fragments with "TABLEREFERENCE" as the fragment type in a query (e.g., a SQL statement), and for each fragment with "TABLEREFERENCE" as the fragment type, the user can request the "SCHEMA" tokens and the "TABLE" tokens, and check if a token has an alias to allow the names to be broken down into elements.

In one example, annotations may appear as follow:

| | |
|---|---|
| select: | TokenClass: KEYWORD |
| *: | TokenClass: TOKEN, SQL Type: STAR |
| /* comment */: | TokenClass: MULTI_LINE_COMMENT |
| from: | TokenClass: KEYWORD |
| aschema: | TokenClass: KEYWORD, SQLType: SCHEMA |
| .: | TokenClass: Token |
| atable: | TokenClass: KEYWORD, SQLType: TABLE |
| as: | TokenClass: KEYWORD |
| t: | TokenClass: KEYWORD, SQLType: ALIAS |
| where: | TokenClass: KEYWORD |
| a: | TokenClass: KEYWORD, SQLType: COLUMN |
| =: | TokenClass: TOKEN |
| 1: | TokenClass: NUMBER |
| all whitespace: | TokenClass: WS |

In one example, a parse tree with annotations may appear as follow:

```
SQLCOMMAND: "select * /* comment */ from aschema.atable as t where a = 1;"
    SELECTSTATEMENT: "select * /* comment */ from aschema.atable as t where a = 1;"
        SELECTCLAUSE: "select *"
            SELECTCOLUMN: " *"
        FROMCLAUSE: " /* comment */ from aschema.atable as t"
            TABLEREFERENCE: " aschema.atable as t"
        WHERECLAUSE: " where a = 1"
            CONDITION: " a = 1"
                CONDITIONBODY: " a = 1"
                    LEFTEXPRESSION: " a"
                        EXPRESSION: " a"
                            COLUMNNAME: " a"
                    RIGHTEXPRESSION: " 1"
                        LEFTEXPRESSION: " 1"
                            EXPRESSION: " 1"
```

An output for the SQL statement 101 of a dialect can be generated using the parse tree. For example, the first output corresponding to the first SQL statement of the first dialect (at block 330) and the second output corresponding to the second SQL statement of the second dialect (at block 350) can be generated in this manner. A first parse tree can be generated for the first dialect using the method 500. A second parse tree can be generated for the second dialect using the method 500. The first output can be generated based on the first SQL statement and the first parse tree, and the second output can be generated based on the second SQL statement and the second parse tree. The SQL statement 101 can refer to either the first SQL statement or the second SQL statement.

In some examples, lexer tokens relevant to the received SQL statement 101 are identified. The platform indicator 102 received with the SQL statement 101 can be used to identify the parse tree corresponding to the dialect supported by the platform identified by the platform indicator 102. For example, the first parse tree for the first dialect can be identified based on the first platform indicator received with the first SQL statement, and the second parse tree for the second dialect can be identified based on the second platform indicator received with the second SQL statement.

Once the relevant parse tree for the appropriate dialect is identified, the parser API 115 iterates the parse tree (e.g., the parse tree 900) and recognizes the lexer tokens that are relevant to the SQL statement 101. In one example, the parser API 115 checks, by traversing through the parse tree, whether the texts, characters, and words of the received SQL statement 101 correspond to keywords collected from the syntax diagram for the dialect. In one example, the parser API 115 can check the lexer tokens in each node in the parser tree to determine whether the SQL statement 101 contains texts, characters, and words that correspond to the keywords (identified by unique lexer IDs), starting from a first childless node and moving up through the parse tree to its parent node, and the parent node of that node, etc (e.g., in an upward direction through the parse tree). Once a child node in the parse tree is determined to be irrelevant to the SQL statement 101, the token is moved up to the parent node of that child node. In other words, the lexer of the parser API 115 processes the SQL statement 101 and tags the texts, characters, and words of the SQL statement 101 that correspond to the lexer tokens of the parse tree.

The texts, characters, and words (e.g., various portions of the SQL statement 101) can be categorized into different unique API fragment IDs. The parser API 115 can generate an annotated parse tree using the lexer IDs, the API fragment IDs, and the texts, characters, and words of the received SQL statement 101. In this manner, the SQL statement 101 is tokenized, i.e., the parser API 115 can understand what to expect based on the lexer tokens.

In that regard, FIGS. 10A-10B are diagrams illustrating an example annotated parse tree 1000, according to some examples. Referring to FIGS. 1-10B, the words that precede the symbol "=>" are the rules (e.g., the lexer IDs) that are considered to be important by the parser API 115. All uppercase words that follow the symbol "=>" are the unique API fragment IDs. The quoted words are the SQL text ranges (e.g., the fragments) of the SQL statement 101 that correspond to the unique API fragment IDs and the lexer IDs. The SQL text ranges are made up from all of the tokens that correspond to the start and end offset of that fragment. A child fragment contains a subset of such tokens that correspond to that fragment's start offset and end offset. The annotated parse tree 1000 still contains logic specific to the dialect of the SQL statement 101 as the annotated parse tree 1000 map rules specific to that dialect to the unique API IDs. In some examples, the annotated parse tree 1000 is an annotated version of the parse tree 900, with lexer IDs irrelevant to the SQL statement 101 removed, and with the API fragment IDs and the SQL text ranges added.

After the annotated parse tree 1000 is generated, the parser API 115 can iterate the annotated parse tree 1000 to generate an API tree. For example, the annotated parse tree 1000 can be used to factor out interfaces that correspond to API fragment IDs in the annotated parse tree 1000. The interfaces are factored out using factory patterns, such that responsive to determining that there is an interface specific to a fragment ID, the interface object is retrieved. The interface object represents a part of the annotated parse tree 1000. If an interface object is not in the list of interfaces, then a generic fragment is assigned. In that regard, FIGS. 11A and 11B are diagrams illustrating an example API tree 1100, according to some examples. Referring to FIGS. 1-11B, the API tree 1100 includes interfaces that correspond to the API fragment IDs in the annotated parse tree 1000. All interfaces in the API tree 1100 inherit from a base interface ISQLFragment which contains the base functionality for accessing child tokens and fragments along with any annotations that the child tokens and fragments may have. In some examples, not all enums (fragment IDs) correspond to a unique interface. In some examples in which there are no helper methods required, the parser API 115 can use the base interface ISQLFragment instead of dealing with another interface. The API tree 1100 does not contain any logic that is platform-specific or dialect-specific. All the annotations and unique IDs in the API tree 1100 are cross-dialect. Accordingly, the API tree 1100 can be the first output or the second output. The interfaces in the API tree 1100 correspond to the first data structures or the second data structures.

Figure 12B:

In some examples, the interfaces can be defined for a computer-readable programming language (such as but not limited to, Java, C++, C#, and so on) that contain helper methods for finding certain fragments or tokens that are of interest for a given type of SQL statement. In one example, the logic needed for defining the manner in which the fragments and the tokens are found are in the base interface of ISQLFragment. In that regard, FIGS. 12A-12C are diagrams illustrating a definition of functions of helper methods 1200, according to some examples. The definition of functions of helper methods 1200 are in C++.

The definition of functions of helper methods 1200 as shown can include injected code that allows a decision to be made about whether a path is valid. An example of the injected code includes the syntax between braces followed by a question mark, such as:

{getServerVersion( )>=1201}?rowLimitingClause)?

The injected code needs to be appropriate for the targeted programming language for which the grammar is generated. In some examples, with respect to Java and C++, the syntax for the definition of functions of helper methods 1200 is limited to functions, and the types of return values are limited to numbers or Boolean. When generating the code for a platform, the code generator is given the file that defines the functions used in the grammar for that programming language, thus allowing the same grammar file to be used for any of the supported languages. This simplifies the generation of the API tree and removes any possible inconsistency between APIs of different languages. In that regard, FIG. 13 illustrates an example implementation of the API interface definition in C++ 1300a and an example implementation of the API interface definition in Java 1300b, according to some examples.

In some examples, after the API tree is constructed, restrictions specified in syntax diagrams are check. FIG. 14 illustrates a portion of a syntax diagram 1400, according to some examples. Referring to FIGS. 1-14, the syntax diagram 1400 allows any number of <filespec> entries. According to the syntax diagram 1400, a user can specify any options in any order. However, the notes associated with the syntax diagram 1400 indicate some restrictions. For example, if FILENAME is specified, then NAME must also be specified. These types of restriction are difficult to capture in the grammar rules and may overcomplicate the grammar rule. Therefore, the syntax diagram 1400 does not show such restrictions. Such restrictions are checked after the API tree is constructed. Checks are defined such that as the parser API 115 can check whether certain assumptions hold true. For example, the parser API 115 can check whether the "FILENAME" option is specified, and if so, checks whether the "NAME" option also specified. If that check fails, the fragment is marked as invalid. This result is similar to the result in which the parser has failed to parse that portion of a SQL statement.

The arrangements described herein have been described with reference to drawings. The drawings illustrate certain details of specific arrangements that implement the systems, methods and programs described herein. However, describing the arrangements with drawings should not be construed as imposing on the disclosure any limitations that can be present in the drawings.

It should be understood that no claim element herein is to be construed under the provisions of 35 U.S.C. § 112(f), unless the element is expressly recited using the phrase "means for."

As used herein, the term "circuit" can include hardware structured to execute the functions described herein. In some arrangements, each respective "circuit" can include machine-readable media for configuring the hardware to execute the functions described herein. The circuit can be embodied as one or more circuitry components including, but not limited to, processing circuitry, network interfaces, peripheral devices, input devices, output devices, sensors, etc. In some arrangements, a circuit can take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on).

The "circuit" can also include one or more processors communicatively coupled to one or more memory or memory devices. In this regard, the one or more processors can execute instructions stored in the memory or can execute instructions otherwise accessible to the one or more processors. In some arrangements, the one or more processors can be embodied in various ways. The one or more processors can be constructed in a manner sufficient to perform at least the operations described herein. In some arrangements, the one or more processors can be shared by multiple circuits (e.g., circuit A and circuit B can comprise or otherwise share the same processor which, in some example arrangements, can execute instructions stored, or otherwise accessed, via different areas of memory). Alternatively or additionally, the one or more processors can be structured to perform or otherwise execute certain operations independent of one or more co-processors. In other example arrangements, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor, etc.), microprocessor, etc. In some arrangements, the one or more processors can be external to the apparatus, for example the one or more processors can be a remote processor (e.g., a cloud based processor). Alternatively or additionally, the one or more processors can be internal and/or local to the apparatus. In this regard, a given circuit or components thereof can be disposed locally (e.g., as part of a local server, a local computing system, etc.) or remotely (e.g., as part of a remote server such as a cloud based server). To that end, a "circuit" as described herein can include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device can include non-transient volatile storage media, non-volatile storage media, non-transitory storage media (e.g., one or more volatile and/or non-volatile memories), etc. In some arrangements, the non-volatile media can take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media can take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device can be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein can show a specific order and composition of method steps, it is understood that the order of these steps can differ from what is depicted. For example, two or more steps can be performed concurrently or with partial concurrence. Also, some method steps that are performed as discrete steps can be combined, steps being performed as a combined step can be separated into discrete steps, the sequence of certain processes can be reversed or otherwise varied, and the nature or number of discrete processes can be altered or varied. The order or sequence of any element or apparatus can be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or can be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions can be made in the design, operating conditions and arrangement of the arrangements without departing from the scope of the present disclosure as expressed in the appended claims.

What is claimed is:

1. A method, comprising:
   generating a representation of each of a plurality of dialects of structured query language (SQL) statements;
   receiving a first SQL statement, the first SQL statement is in a first dialect of the plurality of dialects;
   generating a first output corresponding to the first SQL statement, the first output comprises a plurality of first data structures arranged in a first tree structure, each of the plurality of first data structures corresponds to a portion of the first SQL statement;
   receiving a second SQL statement, the second SQL statement is in a second dialect of the plurality of dialects; and
   generating a second output corresponding to the second SQL statement, the second output comprises a plurality of second data structures arranged in a second tree structure, each of the plurality of second data structures corresponds to a portion of the second SQL statement, wherein a first data structure of the plurality of first data structures is same as a second data structure of the plurality of second data structures, wherein the first data structure and the second data structure are identified by a same identifier (ID).

2. The method of claim 1, wherein the first SQL statement and the second SQL statement have different syntaxes.

3. The method of claim 1, wherein
   generating the representation of each of the plurality of dialects of SQL statements comprises generating grammar rules for the SQL statements of each of the plurality of dialects based on a syntax diagram for each of the plurality of dialects; and the grammar rules are specific to each of the plurality of dialects.

4. The method of claim 3, wherein the grammar rules comprise:
lexer rules used to identify keywords in the syntax diagram and tokenize the keywords as tokens; and
parser rules used to combine the tokens to form a parse tree, wherein the representation corresponds to the parse tree.

5. The method of claim 4, wherein each of the tokens comprises a unique lexer identifier (ID) and annotations corresponding to the unique lexer ID.

6. The method of claim 3, wherein generating the representation of each of the plurality of dialects of SQL statements further comprises converting the syntax diagram for each of the plurality of dialects into a parse tree based on the grammar rules.

7. The method of claim 1, further comprising:
receiving a first platform indicator with the first SQL statement, the first platform indicator identifies the first dialect; and
receiving a second platform indicator with the second SQL statement, the second platform indicator identifies the second dialect.

8. The method of claim 7, wherein
generating the first output corresponding to the first SQL statement comprises identifying a first parse tree for the first dialect based on the first platform indicator; and
generating the second output corresponding to the second SQL statement comprises identifying a second parse tree for the second dialect based on the second platform indicator.

9. The method of claim 8, further comprising:
generating a first annotated parse tree based on the first parse tree and the first SQL statement; and
generating a second annotated parse tree based on the second parse tree and the second SQL statement.

10. The method of claim 9, further comprising:
generating a first application protocol interface (API) tree based on the first annotated parse tree; and
generating a second API tree based on the second annotated parse tree.

11. The method of claim 10, wherein
the first tree structure comprises the first API tree;
the plurality of first data structures comprise interfaces of the first API tree;
the second tree structure comprises the second API tree; and
the plurality of second data structures comprise interfaces of the second API tree.

12. The method of claim 1, wherein the first data structure and the second data structure invoke a same task to be performed with respect to a database.

13. A non-transitory computer-readable medium having computer-readable instructions such that, when executed by a processor, causes the processor to:
generate a representation of each of a plurality of dialects of structured query language (SQL) statements;
receive a first SQL statement, the first SQL statement is in a first dialect of the plurality of dialects;
generate a first output corresponding to the first SQL statement, the first output comprises a plurality of first data structures arranged in a first tree structure, each of the plurality of first data structures corresponds to a portion of the first SQL statement;
receive a second SQL statement, the second SQL statement is in a second dialect of the plurality of dialects; and
generate a second output corresponding to the second SQL statement, the second output comprises a plurality of second data structures arranged in a second tree structure, each of the plurality of second data structures corresponds to a portion of the second SQL statement, wherein a first data structure of the plurality of first data structures is same as a second data structure of the plurality of second data structures, wherein the first data structure and the second data structure are identified by a same identifier (ID).

14. The non-transitory computer-readable medium of claim 13, wherein
generating the representation of each of the plurality of dialects of SQL statements comprises generating grammar rules for the SQL statements of each of the plurality of dialects based on a syntax diagram for each of the plurality of dialects; and
the grammar rules are specific to each of the plurality of dialects.

15. The non-transitory computer-readable medium of claim 14, wherein the grammar rules comprise:
lexer rules used to identify keywords in the syntax diagram and tokenize the keywords as tokens; and
parser rules used to combine the tokens to form a parse tree, wherein the representation corresponds to the parse tree.

16. The non-transitory computer-readable medium of claim 15, wherein each of the tokens comprises a unique lexer identifier (ID) and annotations corresponding to the unique lexer ID.

17. The non-transitory computer-readable medium of claim 14, wherein generating the representation of each of the plurality of dialects of SQL statements further comprises converting the syntax diagram for each of the plurality of dialects into a parse tree based on the grammar rules.

18. The non-transitory computer-readable medium of claim 13, wherein the processor is further configured to:
receive a first platform indicator with the first SQL statement, the first platform indicator identifies the first dialect; and
receive a second platform indicator with the second SQL statement, the second platform indicator identifies the second dialect.

19. The non-transitory computer-readable medium of claim 18, wherein
generating the first output corresponding to the first SQL statement comprises identifying a first parse tree for the first dialect based on the first platform indicator; and
generating the second output corresponding to the second SQL statement comprises identifying a second parse tree for the second dialect based on the second platform indicator.

20. The non-transitory computer-readable medium of claim 19, wherein the processor is further configured to:
generate a first annotated parse tree based on the first parse tree and the first SQL statement; and
generate a second annotated parse tree based on the second parse tree and the second SQL statement.

21. The non-transitory computer-readable medium of claim 20, wherein the processor is further configured to:
generate a first application protocol interface (API) tree based on the first annotated parse tree; and
generate a second API tree based on the second annotated parse tree.

22. A system, comprising:
a memory unit; and
a processor configured to:
- generate a representation of each of a plurality of dialects of structured query language (SQL) statements;
- receive a first SQL statement, the first SQL statement is in a first dialect of the plurality of dialects;
- generate a first output corresponding to the first SQL statement, the first output comprises a plurality of first data structures arranged in a first tree structure, each of the plurality of first data structures corresponds to a portion of the first SQL statement;
- receive a second SQL statement, the second SQL statement is in a second dialect of the plurality of dialects; and
- generate a second output corresponding to the second SQL statement, the second output comprises a plurality of second data structures arranged in a second tree structure, each of the plurality of second data structures corresponds to a portion of the second SQL statement, wherein a first data structure of the plurality of first data structures is the same as a second data structure of the plurality of second data structures, wherein the first data structure and the second data structure are identified by a same identifier (ID).

* * * * *